Patented Nov. 11, 1930

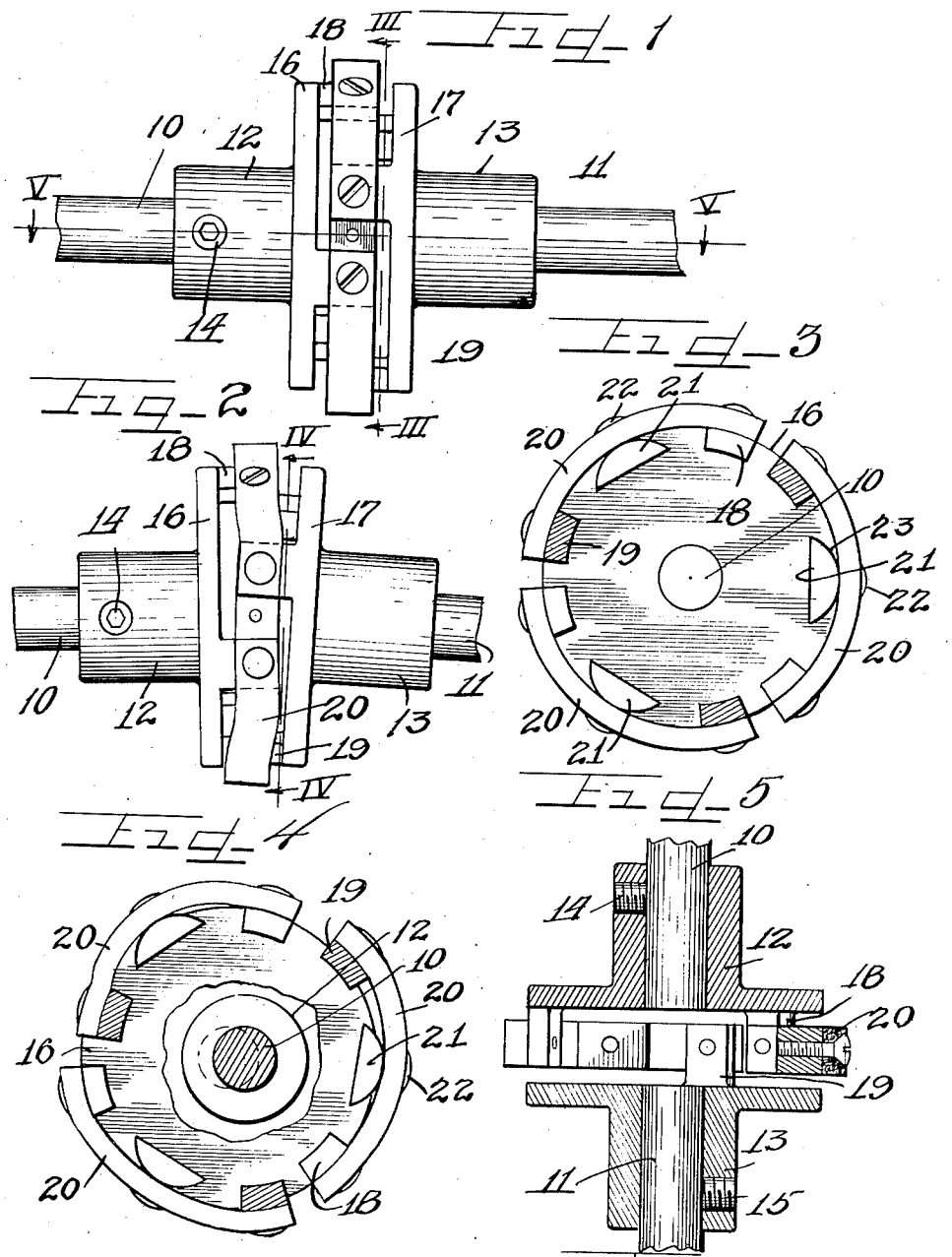

1,781,409

UNITED STATES PATENT OFFICE

CHARLES L. RAYFIELD, OF CHICAGO, ILLINOIS, ASSIGNOR TO RAYFIELD MANUFACTURING COMPANY, OF CHICAGO, ILLINOIS, A CORPORATION OF ILLINOIS

COUPLING

Application filed May 3, 1928. Serial No. 274,695.

My invention relates to couplings, and more particularly to a flexible coupling similar to a governor in action and designed to have a minimum of friction between the parts thereof.

An object of my invention is to provide a simple and inexpensive flexible coupling adapted to efficiently connect a pair of shafts in such a manner as to substantially eliminate wear on the bearings of the shafts.

Another object of this invention resides in the provision of a coupling having a higher degree of flexibility than the conventional analogous couplings and one which is designed to permit of the shafts connected therewith to revolve smoothly and quietly even though they may not be in perfect mechanical alignment.

A further object of my invention has to do with the provision of a flexible coupling including floating means tending to at all times equalize the strain on the links of the coupling.

A still further object of the invention is the provision of a flexible coupling including a pair of cooperable members connected by flexible means designed to at all times minimize the pull on the coupling parts and to thereby reduce the bearing wear of the shafts, connected to the coupling members, to a minimum.

Another and further object is the provision of a flexible coupling designed to have a crank-like motion and including centrifugal means tending to at all times keep the coupling parts in aligment.

In accordance with the general features of my invention I provide a coupling including a pair of cooperable members connected by a plurality of flexible links, each link consisting of a strip of resilient material having a weight attached thereto; the weights on the links being spaced equidistantly from each other and being arranged to float between the coupling members so as to equalize the strains on the links, thereby preventing the links from pulling on the coupling members.

Other objects and advantages of my invention will more fully appear from the following detailed description taken in connection with the accompanying drawing, which illustrates a single embodiment thereof and in which:

Figure 1 is an elevation of my novel coupling illustrating it as being applied to a pair of aligned shafts;

Figure 2 is a view similar to Figure 1 illustrating how the coupling looks when the shafts are unaligned;

Figure 3 is a vertical sectional view taken on substantially the line III—III of Figure 1 looking in the direction indicated by the arrows;

Figure 4 is a view similar to Figure 3 taken on substantially the line IV—IV of Figure 2 looking in the direction indicated by the arrows and illustrating the condition of the links when the coupling members are unaligned, and Figure 5 is a sectional view taken on substantially the line V—V of Figure 1.

In the drawings:

Like reference characters designate similar parts throughout the several views. The reference characters 10 and 11 designate a pair of shafts connected by my novel coupling which includes a pair of cooperable coupling members 12 and 13 secured to shafts 10 and 11, respectively. Coupling member 12 is secured to shaft 10 by a setscrew 14, and coupling member 13 is secured to shaft 11 by a setscrew 15.

The coupling member 12 includes an annular plate 16 and the coupling member 13 includes an annular plate 17. Each of these plates 16 and 17 has formed integral with it a plurality of laterally extending lugs 18—19. I have illustrated each plate as being provided with three of these lugs. The three lugs on one plate are staggered relative to the lugs on the other plate. Also it is to be noted that each lug of each plate extends between two other lugs on the other plate.

Each lug 18 on plate 16 is connected to a lug 19 on plate 17 by means of a flexible link 20. Each of the links 20 comprises a strip of flexible material, such as leather or "thermoid" fabric, having its ends fastened to adjacent cooperating lugs 18 and 19, as shown in Figure 3. I have attained excellent results with this fabric which is of the same nature as the fabric used in brake bands and shock absorbers. The qualities which make this fabric desirable for use in coupling links are its high degree of flexibility and its inelasticity. Then, too, it is not affected by oil as is the case with rubber. The intermediate portion of each link 20 has secured to it a counterweight 21 which may be fastened to the link by a bolt or screw 22. Each of these weights 21 is shaped so as to comprise a segment of a circle and has its arcuate surface 23 disposed in contact with the inner surface of the associated link 20.

The operation of my novel coupling is briefly as follows: Normally the coupling members should be in substantial alignment, as shown in Figures 1 and 3. However, it is of course to be understood that a pair of shafts such as shafts 10 and 11 in Figure 1 are never in reality in perfect axial alignment and as a result the coupling must during the rotation of the shafts act more or less as a crank due to the eccentric relation of one shaft to the other. This means that the links comprising the coupling are subjected to more or less flexing with each rotation of the coupling. The links are designed to be arranged in a substantial circle, as is clearly shown in Figure 3. If the shafts connected to the coupling are slightly out of alignment, the links will assume positions such as those shown in Figures 2 and 4.

In Figure 4 it will be noted that when the coupling member 12 is rotated in a clockwise direction by shaft 10 the lowermost pair of links 20 are subjected to a stretching strain, whereas the link 20 is bulged outwardly. In other words, on account of the shafts being out of alignment, one of the links must be bulged outwardly, as shown in Figure 4. Now if it were not for the counterweights 21, the two lowermost links shown in Figure 4 would be subjected to strains, whereas the uppermost or outwardly bulging link would be looped so as to be relatively slack. The function of the weights is to equalize the strains on the links and to thereby prevent pulling of the coupling members. The centrifugal action of the counterweight 21 associated with the uppermost link in Figure 4 tends to impose a strain on this link so as to maintain it relatively tight and to thereby relieve some of the strains on the other two links 20.

As the coupling rotates one link will be distorted outwardly, then the next link, and so on. This slack in the links is automatically compensated for by the counterweights. By equalizing the pull on the lugs 18 and 19 connected to the ends of the links it will be evident that the coupling members will not be subjected to any substantial pull and will for that reason reduce considerably the wear upon the bearings in which the shafts 10 and 11 are journaled.

From the foregoing it will be evident that I have provided a coupling having a plurality of flexible links equipped with floating counterweights arranged in a circle in a plane between the cooperating coupling members; the counterweights being designed to automatically take up the slack in the links as they flex during the rotation of the coupling and to thereby equalize the strains on the links so as to cause the pull on all of the lugs 18 and 19 to be substantially equal. To the best of my knowledge, I am the first in the coupling art to provide a coupling wherein the centrifugal action of floating weights is utilized to equalize the strain on the links between the coupling members. This arrangement insures an efficient and quiet operating coupling. In fact, I have attained excellent results by using this coupling in connection with the motor shaft and the driven shaft of an oil burner, which shafts are operated at a relatively high speed, and I find that my coupling materially reduces noise incident to the operation of the oil burner by the motor and greatly minimizes the wear and tear on the bearings of the shafts. Moreover, I have not been able to obtain on the market a coupling which would last any appreciable time for the above discussed purpose. The conventional couplings which I have experimented with not only are of relatively short life but impose a great amount of wear upon the bearings of the shafts. The coupling of my inventon with its centrifugal weights eliminates practically all friction between the coupling members and thereby obviates the difficulties experienced in connection with the standard or conventional couplings.

The leather links 20 are of such a flexible nature that they may be stretched, bent laterally, twisted, and bent edgewise. Thus it will be evident that the links are adapted to meet all of the conditions and requiremens to which the coupling may be exposed when in service.

In conclusion it will be clear that I have provided a coupling wherein the coupling members are connected by flexible elements including floating centrifugal weights for at all times equalizing the strain on the links and to thereby minimize the wear on the bearings of the shafts.

Now, of course, it is to be understood that although I have illustrated and described in detail the preferred form of my invention, the invention is not to be thus limited, but only in so far as defined by the scope and spirit of the appended claims.

I claim as my invention:

1. In a coupling, a pair of cooperable coupling members, and a plurality of separate links for connecting said coupling members, each link comprising a strip of resilient material having connected thereto a centrifugal weight effective at all times during the rotation of the coupling to counteract the effect of the centrifugal action of the weights on the other links.

2. In a coupling, a pair of cooperating coupling members, a plurality of separate links for connecting said coupling members, and a plurality of counterweights connected to said links and balanced against each other, said weights being so arranged as to tend to at all times substantially equalize the pull on the links during the rotation of the coupling.

3. In a coupling, a pair of cooperable coupling members, a plurality of links for connecting the coupling members, each link comprising a strip of flexible material having one end connected to one of the coupling members and having its other end connected to the other coupling member, and a plurality of weights connected to said links, each weight being secured to an intermediate portion of one of the links and being arranged so as to at all times be effective during the rotation of the coupling to counteract the effect of the centrifugal action of the weights on the other links.

4. In a coupling, a plurality of cooperable coupling members, a plurality of flexible links for connecting said coupling members and normally positioned so as to form a substantial circle, and counterweight means connected to said links tending upon the distortion of any one of the links to substantially equalize the strain on the links during the rotation of the coupling, said weights being arranged in a circle of their own between the coupling members during rotation of the coupling members.

5. In a coupling, a plurality of cooperable coupling members, a plurality of flexible links for connecting said coupling members and normally positioned so as to form a substantial circle, and counterweight means connected to said links and tending to substantially equalize the strain on the links, during the rotation of the coupling, said counterweight means comprising a plurality of weights, there being one weight for each link, each of said weights comprising a segment of a circle with its outer or arcuate surface facing the cooperable surface of the associated link.

6. In a coupling, a plurality of cooperable coupling members, a plurality of flexible links for connecting said coupling members and normally positioned so as to form a substantial circle, and counterweight means connected to said links so as to at all times float between the coupling members during the rotation of the same, each of said links comprising a flexible strip of material having one end connected to one of the coupling members and its other end connected to the other coupling member so as to be bent into a curved form.

In testimony whereof I have hereunto subscribed by name at Chicago, Cook County, Illinois.

CHARLES L. RAYFIELD.